US009170610B2

(12) United States Patent
Vroom et al.

(10) Patent No.: US 9,170,610 B2
(45) Date of Patent: Oct. 27, 2015

(54) HIGH DENSITY DOCKING STATION

(71) Applicant: Henge Docks LLC, Arlington, VA (US)

(72) Inventors: Matthew Leigh Vroom, San Francisco, CA (US); Benjamin Edwards Maskell, Arlington, VA (US)

(73) Assignee: Henge Docks LLC, Arlington, VA (US)

( * ) Notice: Subject to any disclaimer, the term of this patent is extended or adjusted under 35 U.S.C. 154(b) by 128 days.

(21) Appl. No.: 14/145,995

(22) Filed: Jan. 1, 2014

(65) Prior Publication Data
US 2015/0185773 A1 Jul. 2, 2015

(51) Int. Cl.
*G06F 1/16* (2006.01)

(52) U.S. Cl.
CPC .................................. *G06F 1/1632* (2013.01)

(58) Field of Classification Search
USPC .......................... 320/108, 101, 115, 113, 107;
361/679.41, 679.31, 679.09, 679.43,
361/679.01, 679.58, 679.47, 679.4, 679.21,
361/679.33, 679.53, 679.57, 679.27,
361/679.03, 679.59, 679.44; 455/73, 79,
455/41.1, 552.1, 7, 436, 3.02, 3.06, 41.12,
455/557, 573, 445, 569.1, 566, 550.1,
455/553.1; 710/303, 260, 104, 100, 304,
710/113, 114; 439/540.1, 628, 675, 39,
439/658; 345/172, 173, 174, 175, 176, 158,
345/156, 419, 420, 503, 629, 633
See application file for complete search history.

(56) References Cited

U.S. PATENT DOCUMENTS

| | | | |
|---|---|---|---|
| 2013/0003291 A1* | 1/2013 | Zhou | 361/679.41 |
| 2013/0183864 A1 | 7/2013 | Hopkins | |
| 2013/0184037 A1 | 7/2013 | Hopkins | |
| 2014/0097793 A1* | 4/2014 | Wurtz et al. | 320/108 |
| 2014/0357966 A1* | 12/2014 | Al-Ali et al. | 600/301 |

OTHER PUBLICATIONS

Kickstarter, Elevation Dock: The Best Dock for iPhone http://wwvv.kickstarter.com/projects/hop/elevation-dock-the-best-dock-for-iphone.
ElevationLab, ElevationDock 2, http://www.elevationlab.com/products/elevationdock-for-iphone5.

* cited by examiner

*Primary Examiner* — Hung Duong
(74) *Attorney, Agent, or Firm* — Benjamin E. Maskell

(57) ABSTRACT

Disclosed is a docking station for holding an electronic device having a main body, a first channel in the main body, a back side of the first channel, a front side of the first channel, a first plug in the first channel, a first port electronically connected to the first plug, and an extraction force associated with the first plug. A normal force of the main body is greater than an extraction force associated with the first plug. The main body is formed primarily from a first material and a net density of the main body is greater than half of the density of the first material.

22 Claims, 7 Drawing Sheets

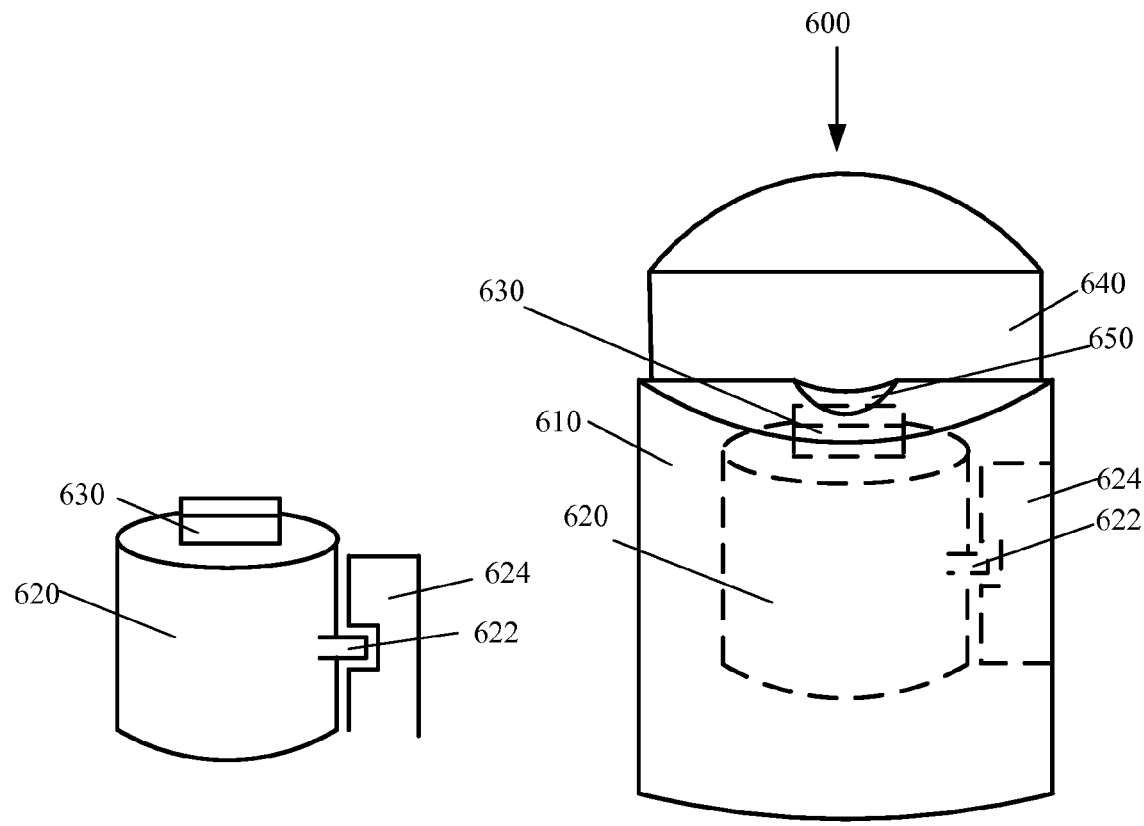
FIG. 6A
FIG. 6B
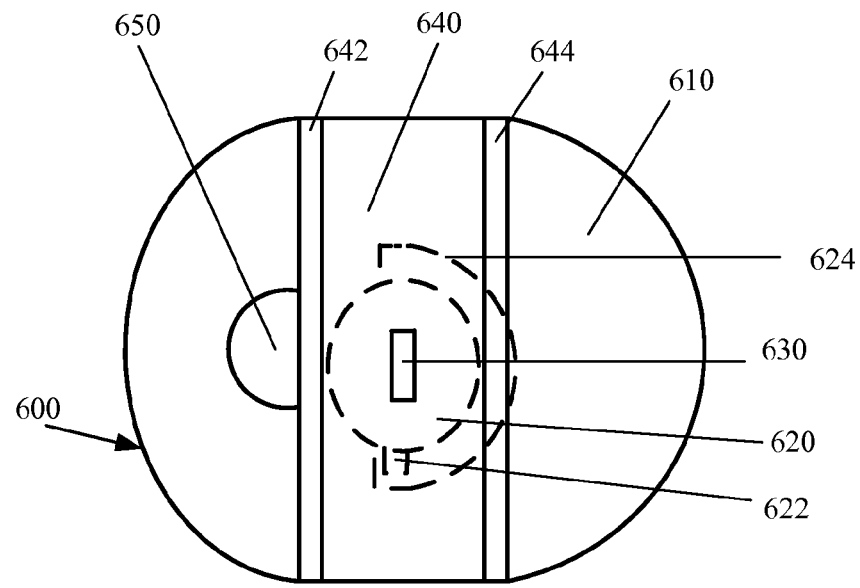
FIG. 6C

HIGH DENSITY DOCKING STATION

BACKGROUND OF THE INVENTION

1. Field of the Invention

The embodiments of the invention relate to a docking station for holding an electronic device. More particularly, the present invention relates to a docking station with a plug to connect to the electronic device where the docking station has a weight greater than the force necessary to remove the electronic device from the plug.

2. Discussion of the Related Art

Generally speaking, a docking station is an accessory designed to physically support an electronic device that is placed on it, typically to raise its screen up to a more ergonomic height, provide cooling, or just to conserve desk space. Docking stations can include one or more plugs to interface with the electronic device and one or more ports electrically connected to the plugs. External connectors can be connected to the one or more ports to connect the docking station to other electronic devices.

Typically, docking stations are made of a light weight/low density material, such as plastic or aluminum. The density of plastic or aluminum is low compared to other metals, like titanium, zinc, iron, nickel, and copper. Current manufacturing motivations are to use as little material as possible to save on production costs. Current manufacturing motivations are to make devices weigh as little as possible so that they can be shipped cheaply. Current manufacturing motivations are to include ample air spaces inside a housing of the electronic device so that the electronics, circuit boards, and wires can be easily routed. The related art docking stations are made of such materials to not add extra weight to the device, to match the consistency of the outer shell of the electronic device, or to enable mobility of the docking stations.

Although a lesser weight may be desirable, a user utilizing a docking station that connects the electronic device to an external computer or electrical source are burdened and inconvenienced due to the light weight and low density properties of those docking station. A user wishing to remove an electronic device from the docking station and disconnect the electronic device from the convertor dock will be required to either: 1) apply an opposite force on the docking device to remove the electronic device that is connected to the docking station, 2) lift the docking station and pull the electronic device and docking station in opposite directions, or 3) affix the docking station to a surface by other means, like glue, to prevent the docking station from being lifted when applying the force necessary to overcome the extraction force associated with the convertor dock plug. Without the application of the opposite force by the user or other object, when lifting the electronic device, the docking station will remain connected to the electronic device due to the extraction force associated with the plug.

Other types of related art docking stations are of a larger size to accommodate additional features such as speakers, amplifiers, power converters, and advanced electronics. These additional components add to the size of the docking station and consequently to the weight of the docking station. A larger, heavier docking station creates a larger normal force applied by the docking station to the surface it is resting on. However, larger related art docking stations are undesirable due to the excess amount of space that larger docking stations consume; one of the main features of a docking station is to improve the ergonomic environment related to the electronic device. The consumption of additional space in inconvenient and can be undesirable to users.

SUMMARY OF THE INVENTION

Accordingly, embodiments of the invention are directed to a high density docking station that substantially obviates one or more of the problems due to limitations and disadvantages of the related art.

An object of embodiments of the invention is to provide a docking station that enables users to use a docking station with multiple electronic devices, all which may have different widths, lengths, and circumferences, with the need to only have one docking station.

Another object of embodiments of the invention is to allow a user to disconnect an electronic device from a docking station that is connected to the electronic device through a convertor dock without having to apply additional force to the docking device to remove the electronic device, while maintaining a small physical size.

Yet another object of embodiments of the invention is to provide interconnectivity between a personal computer and an electronic device while allowing a user to interact fully with the electronic device while connected to the docking station.

Still another object of embodiments of the invention is to provide a docking station with a relatively high mass sufficient to create a normal force greater than the extraction force associated with a convertor dock plug, while maintaining the volume of the docking station minimal by using a high density material to create the relatively high mass.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a high density docking station includes a main body formed from a high density material and a channel. The channel has a front and back side, and a plug embedded within such channel. The plug has an associated extraction force and is electrically connected to a port. The weight of the main body is greater than the extraction force associated with the plug. The net density of the main body is greater than half of the density of the high density material.

In another aspect of the invention, a high density docking station includes a main body formed of a high density material, a shaft, and a channel. The channel includes a front and back side, and a plug positioned in the channel. The plug is connected to the shaft within the main body and the shaft is rotatably connected to the main body. The plug has an associated extraction force and is electrically connected to a port. The weight of the main body is greater than the extraction force associated with the plug. The net density of the main body is greater than half of the density of the high density material.

In another aspect of the invention, a high density docking station includes a main body primarily formed of a high density material, a shaft, an interchangeable insert, and a channel. The channel includes a front and back side, and a plug embedded within such channel. The insert consists of front, back, a bottom wall, and a cut out in the bottom wall. The cut out in the bottom wall allows the plug to protrude through the insert and connect to the electronic device. The insert is can be sized to accommodate specific electronic devices. The plug is connected to the shaft and the shaft is rotatably connected to the main body. The plug has an associated extraction force and is electrically connected to a port. The weight of the main body is greater than the extraction force associated with the plug. The net density of the main body is greater than half of the density of the high density material.

In yet another aspect, a high density docking station includes a second channel intersecting the first channel to allow interaction with the electronic device while the electronic device is connected to and seated on the docking station. Certain electronic devices include physical or touch sensitive buttons near the lower front edge of an electronic device; access to such buttons is desirable when using the electronic device. As such, the second channel allows a user to interact with these types of buttons while the electronic device is connected to the docking station.

In still another aspect, a high density docking station includes a USB port electronically connected to the plug. The USB port provides both data connectivity and electronic charging capabilities to the docking station. In addition, a high density docking station includes an analog audio output electronically connected to the plug, providing connectivity with audio receiver equipment or any device for audibly producing an audio signal.

In another aspect, a high density docking station includes a mechanical stop mechanism which permits the rotation of the shaft within the main body, but limits the rotation of the shaft between the positions of 0 degrees and 180 degrees. When applying a rotational force to the plug, which is attached to the shaft, the mechanical stop will permit the rotation to continue until the shaft reaches the designation 0 degree or 180 degree position. This allows the first plug to change its orientation to match the orientation of the receptacle plug within an electronic device.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIGS. 6A-B is a section perspective view of the shaft and mechanical stop according to an exemplary embodiment of the invention;

FIG. 6C is a section top-down view of the shaft and mechanical stop according to an exemplary embodiment of the invention;

DETAILED DESCRIPTION OF THE PREFERRED EMBODIMENTS

Figure 1:
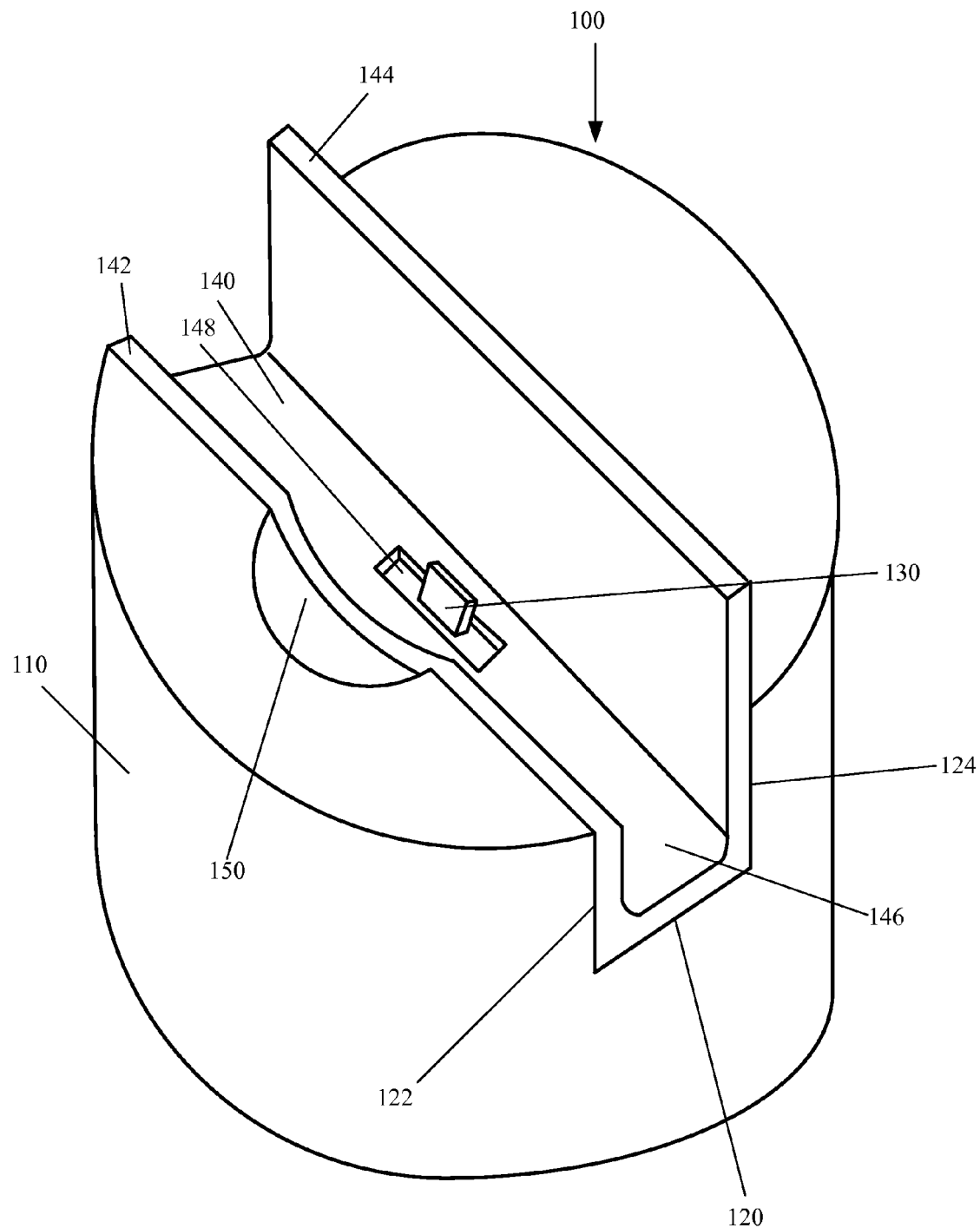
FIG. 1 is a perspective view of docking station according to an exemplary embodiment of the invention.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1 is a perspective view of docking station according to an exemplary embodiment of the invention. As shown in FIG. 1, a docking station 100 includes a main body 110, a first channel 120, a plug 130, an interchangeable insert 140, and a second channel intersecting the first channel 150. A first channel includes a front wall 122 and a back wall 124. An interchangeable insert 140 includes a front wall 142, a back wall 144, a bottom wall 146, and a cut-out 148. In addition, an interchangeable insert 140 can also have a left wall (not shown) or a right wall (not shown).

The main body 110 of the docking device 100 is formed primarily from a first material (not shown). The first material can be of a high density to maximize the mass of the docking station 100 while maintaining a compact size. As such, the first material that the main body 110 of the docking device 100 can be formed of Zinc, Titanium, Tin, Iron, Nickel, Tungsten, Copper, or alloys of the high density metals.

The density of the first material primarily forming the main body 110 can be at least 4,500 kg/m$^3$ or greater. This density allows the main body 110 to have a mass sufficient to create a normal force greater than the extraction force associated with the plug 130, while maintaining a smaller volume of the main body 110.

The main body can also consist of other materials including plastics, such as polypropylene, polystyrene, high impact polystyrene, polyvinyl chloride, high-density polyethylene, low-density polyethylene, polyamides, acrylonitrile butadiene styrene, polycarbonate, or polycarbonate/acrylonitrile butadiene styrene blend.

The main body can also consist of other materials including metal alloys, such as aluminum, alloys of aluminum, copper, alloys of copper, alloys of iron, alloys of nickel, alloys of titanium, alloys of tin, and alloys of zinc.

The first channel 120 is entrenched in the main body 110 of the docking station 100. It is sized to allow different sized interchangeable inserts 140 to fit into the first channel 120.

The plug 130 is situated at the bottom of the first channel 120 and can be attached to a rotatable shaft (not shown). The plug 130 is connected to the main body 110.

The plug 130 is used to establish a computer bus connection for communication and power supply between computers, electric sources, and/or electronic devices. The plug 130 can be USB plug, in the form of a Micro-A plug, Micro-B plug, Mini-A plug, Mini-B plug, Standard-A plug, or Standard B-plug. In addition the plug 130 can be in the form of other proprietary computer bus and power connectors, including a UC-E6 plug, a 30-pin connector, and a lightning connector.

The plug 130 has an associated extraction force when removing the electronic device from the docking station. Each specific type of plug has a varying associated extraction force, as such, depending on the type of plug 130 that attached to the main body 110, the mass of the main body 110 can be selected during manufacturing to exceed the extraction force associated with each type of plug 130.

The interchangeable insert 140 is connected to the first channel 120. The interchangeable insert 140 is fitted to slide into the first channel 120. For the interchangeable insert 140 to fit within the first channel 120, the width between the interchangeable insert 140 front wall 142 and back wall 144 can be equal to or less than the width between the first channel's front wall 122 and back wall 124.

The interchangeable insert 140 can be connected to the first channel 120 by using specific inserts including raised portions (not shown) which prevent the interchangeable insert 140 from sliding out of the first channel 120. The raised portions on the interchangeable insert 140 can have matching receptacle indentations in the first channel 120 to prevent the interchangeable insert 140 from sliding out of the first channel 120.

The interchangeable insert 140, aside from the plug 130, can be the only portion of the docking device 100 that physically touches an electronic device. The electronic device can rest mainly on the interchangeable insert 140 back wall 144 and bottom wall 146. The interchangeable insert's front wall 142 is can be used to stabilize the electronic device and can allow such device to lean at an angle that is ergonomically desirable to the user.

The cut-out 148 of the interchangeable insert 140 can be fitted to allow the plug 130 to protrude through the interchangeable insert 140. The cut out enables the plug 130 to connect with the electronic device.

The second channel 150 is embedded in the main body 110 and intersects with the first channel 120. In addition, the second channel can be embedded in the front wall 142 of the interchangeable insert 140. The second channel 150 can provide access to essential buttons or features that the electronic device may have. The second channel 150 can provide access for a user's finger or stylus to interact with the buttons which may otherwise be blocked by the docking station. As such, a user need not remove the electronic device from the docking station to fully use the electronic device.

Normal Force is the component, perpendicular to the surface (surface being a plane) of contact, of the contact force exerted on an object by, for example, the surface of a floor or wall, preventing the object from penetrating the surface. An object at rest on a surface applies a normal force against the surface it is resting on. The Normal Force applied by an object is calculated as $N=mg$, where N is the normal force, m is the mass of an object, and g is gravitational field strength. The gravitational field strength of Earth is normally calculated as 9.81 m/s². As such, the mass associated with the main body 110 can be sufficient to create a Normal Force greater than the extraction force associated with the plug 130.

As the plug 130 may vary depending on the type of electronic device that the docking station 100 will hold, the mass of the main body 110 will vary accordingly. For illustrative purposes, the associated extraction force of the plug 130 can be approximately 13.9 Newtons (kg m/²) (approximately the weight of two 24 oz Miller Lite Tall Boys). Using the Normal Force formula above, the docking station 100 mass can be greater than or equal to 13.9 Newtons divided by 9.81 m/s². As such, in this illustration, the main body's 100 mass can be greater than or equal to approximately 1.418 kg. Using the Normal Force formula above, a 1.418 kg mass of the docking device 100 multiplied by 9.81 m/s² leads to the main body 110 having a Normal Force of 13.9 Newtons. As such, the Normal Force applied by the main body 110 is greater than the extraction force associated with the plug 130. This allows a user applying the sufficient force to disconnect the electronic device from the plug 130 to successfully remove an electronic device while the docking station 100 remains in place and without requiring an additional opposite force added to the docking station 100. As such, this achieves the objectives of the invention without requiring an attachment applying additional force or requiring a user to apply an opposite force to the device.

The main body 110 has of a density. The formula for density is $p=m/v$, where p is the density of an object, m is the mass of an object, and v is the volume of an object. As such the Net Density of the main body 110 is mass of the main body 110 divided by the volume of the main body 110.

Volume is the quantity of three-dimensional space enclosed by some closed boundary. The formula for calculating the volume of a rectangular prism is length multiplied by width multiplied by height of the rectangular prism. For illustrative purposes, the length and width of the main body 110 can be 7.7 cm and the height can be 5.5 cm, therefore having an approximate volume of 326 cm³.

The main body 110 can be formed primarily from a first material, typically Zinc, Tin, Iron, Nickel, and Copper. For illustrative purposes, the density of Zinc is generally 7.134 grams per cubic centimeter. As such, in this illustration, the Net Density of the docking station can be greater than 3.57 g/cm³. Using the density formula, where p is 3.57 g/cm³ and approximate volume is 326 cm³, the minimum mass of the main body 110 can be approximately 1164.177 g or 1.164 Kg.

Following the illustrations above where the main body 110 has a mass of 1361 g, or 1.361 Kg, and a volume of approximately 326 cm³, the main body 110 will have a Net Density of approximate 4.174 g/cm³. This then satisfies that the Normal Force of the main body 110 is greater than the extraction force associated with the first plug 130, and that Net Density of the main body 110 is greater than half of the density of the first material, in this illustration, Zinc.

Figure 2:
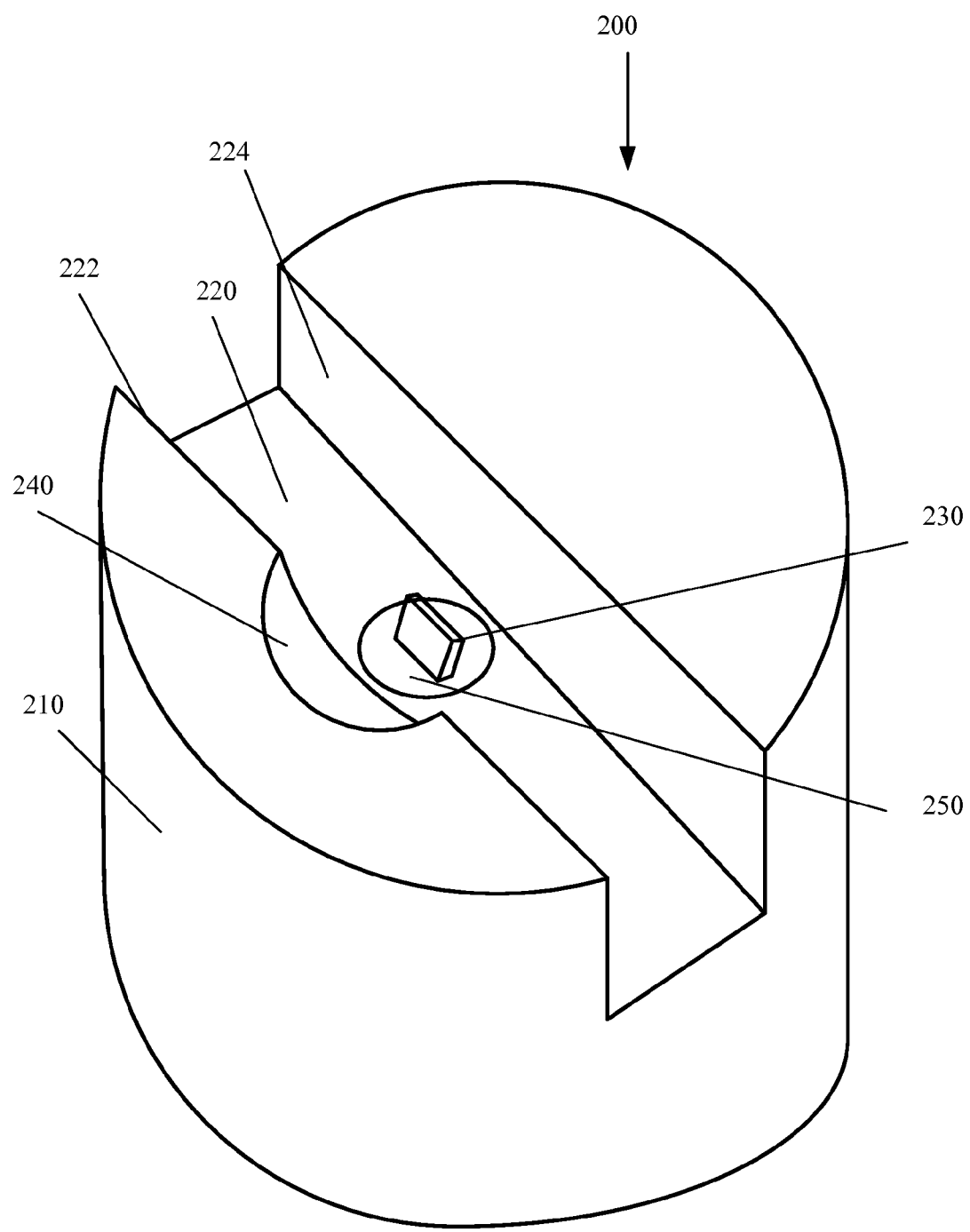
FIG. 2 is a perspective view of docking station with an interchangeable insert removed to show a plug and a shaft according to an exemplary embodiment of the invention.

FIG. 2 is a perspective view of docking station with an interchangeable insert removed to show a plug and a shaft according to an exemplary embodiment of the invention. As shown in FIG. 2, a docking station 200 includes a main body 210, a first channel 220, a first plug 230, a second channel intersecting the first channel 240, and a shaft 250. A first channel includes a front wall 222 and a back wall 224

The first channel 220 can be entrenched in the main body 210 of the docking station 200. It can be sized to allow different sized interchangeable inserts (not shown) to fit into the first channel 220.

The plug 230 can be situated at the bottom of the first channel 120 and can be attached to a rotatable shaft 250. The plug 230 can be connected to the main body 210.

The second channel intersecting the first channel 240 can be embedded in the main body 210.

Figure 3A:
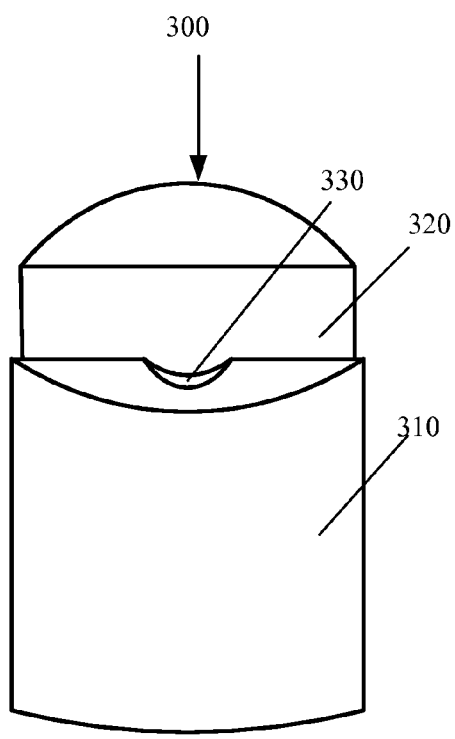
FIG. 3A is a front view of docking station according to an exemplary embodiment of the invention.

FIG. 3A is a front view of docking station according to an exemplary embodiment of the invention. As shown in FIG. 3, a docking station 300 includes a main body 310, a first channel 320, and a second channel 330.

Figure 3B:
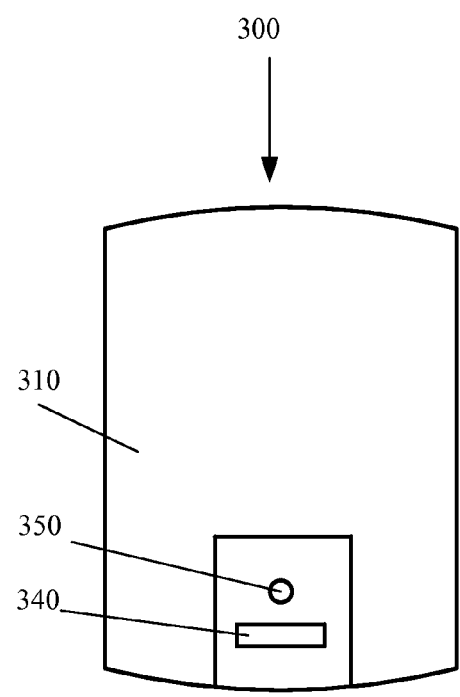
FIG. 3B is a rear view of docking station according to an exemplary embodiment of the invention.

FIG. 3B is a rear view of docking station according to an exemplary embodiment of the invention. As shown in FIG. 3, a docking station 300 includes a main body 310, a port 340, and an audio output 350. The port 340 can be electronically connected to the first plug (not shown). The audio output 350 can be electronically connected to the first plug (not shown).

The port 340 can be a USB plug, such as a Micro-A plug, Micro-A plug receptacle, Micro-B plug, Micro-B plug receptacle, Mini-A plug, Mini-A plug receptacle, Mini-B plug, Mini-B plug receptacle, Standard-A plug, Standard-A plug receptacle, Standard B-plug, Standard B-plug receptacle. In addition the port 340 can be in the form of other proprietary computer bus and power connectors, such as a UC-E6 plug, UC-E6 plug receptacle, a 30-pin connector, 30-pin receptacle, lightning connector, and a lightning connector receptacle.

Figure 4A:
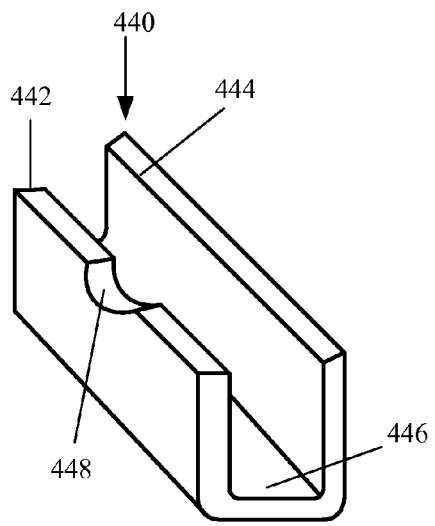
FIGS. 4A-4B are perspective views of the interchangeable inserts according to exemplary embodiments of the invention.
Figure 4B:
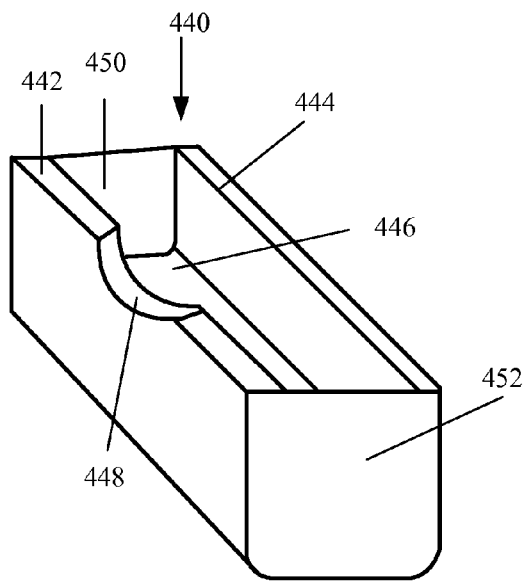

FIGS. 4A-4B are perspective views of the interchangeable inserts according to exemplary embodiments of the invention. As shown in FIGS. 4A-4B, an interchangeable insert 440 includes a front wall 442, a back wall 444, a bottom wall 446, a second channel 448, a right wall 450, and a left wall 452.

The interchangeable insert 440 can be made of plastic such as polypropylene, polystyrene, high impact polystyrene, polyvinyl chloride, high-density polyethylene, low-density polyethylene, polyamides, acrylonitrile butadiene styrene, polycarbonate, or polycarbonate/acrylonitrile butadiene styrene blend, or a polymer based material, including latex rubber, rubber, and elastomer.

The height of the front wall 442 and back wall 444 can vary depending on the height of electronic device to be stationed on the docking device. Generally, the front wall 442 can have a lesser height than the back wall 444 to ensure that the electronic device is not blocked by the interchangeable insert 440.

The distance between the interchangeable insert 440 front wall 442 and back wall 444 can be determined by the thickness of the electronic device the interchangeable insert 440 will be fitted for. That is, the width of the intended electronic device can determine the distance between the interchangeable insert's 440 front wall 442 and back wall 444. The interchangeable insert's 440 front wall 442 and back wall 444 can be less than or equal to the width between the front wall and back wall of the first channel (not shown).

The second channel 448 intersecting the front wall 442 can correspond to the second channel in the main body intersecting the front side of the first channel (not shown).

The right wall 450, and a left wall 452 are physically connected to the interchangeable insert 440. The right wall 450 and left wall 452 can be used to enclose smaller electronic devices within the docking station, thereby providing additional stability to the electronic device while a user interacts with the electronic device.

Figure 4C:
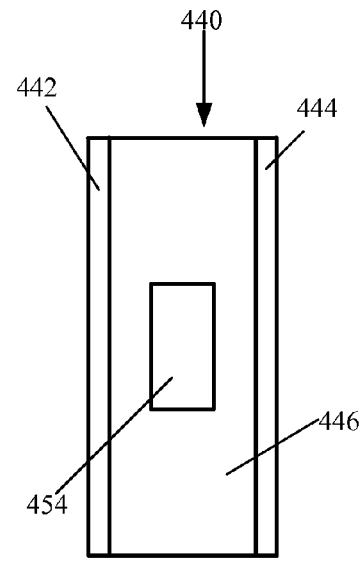
FIGS. 4C-4D are top-down views of the interchangeable inserts according to exemplary embodiments of the invention.
Figure 4D:
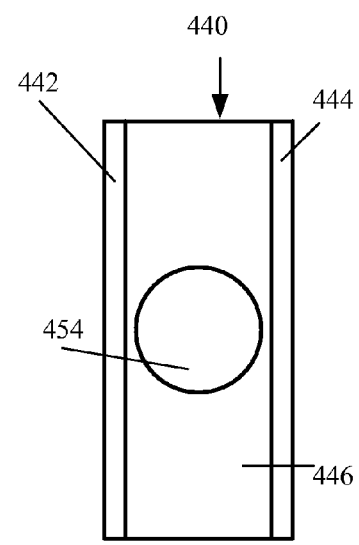

FIGS. 4C-4D are top-down views of the interchangeable inserts according to exemplary embodiments of the invention. As shown in FIGS. 4C-4D, an interchangeable insert 440 includes a front wall 442, back wall 444, a bottom wall 446, and a cut-out 454.

The cut-out 454 is fitted to allow the plug (not shown) to protrude through the interchangeable insert 440. The cut out 454 can enable the plug (not shown) to connect with the electronic device while the electronic device rests on the interchangeable insert 440.

The cut-out 454 can be in rectangular, circular, oval, or square (not shown). The cut-out 454 shape can depend on the plug's shape (not shown) and whether the plug can be rotated in a rectangular, circular, oval, or square cutout.

One of skill in the art will appreciate that the cut-out 454 can be employed in different methods to achieve the objectives of the invention, including allowing the plug (not shown) to protrude through the interchangeable insert 440.

Figure 5A:
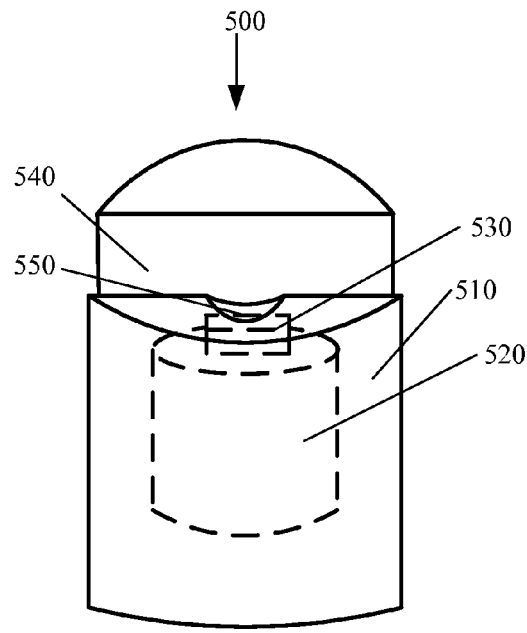
FIGS. 5A-B is a sectional perspective view of the shaft according to an exemplary embodiment of the invention.
Figure 5B:
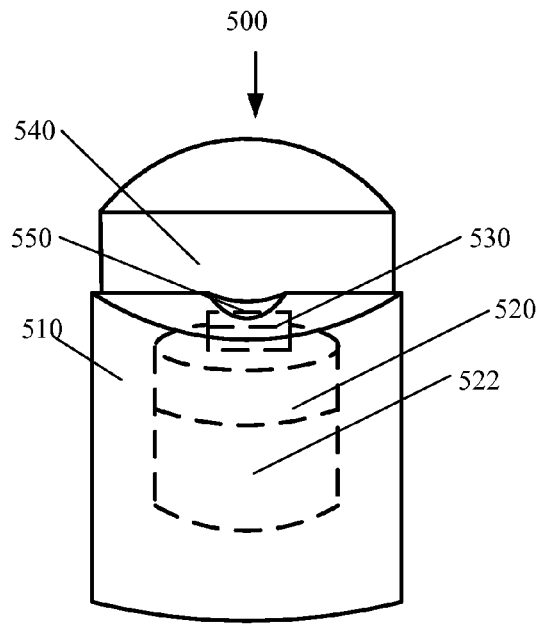

FIGS. 5A-B is a sectional perspective view of the shaft according to an exemplary embodiment of the invention. As shown in FIGS. 5A-B, a docking device 500 includes a main body 510, a shaft 520, a plug 530, a first channel 540, a second channel intersecting the first channel 550.

The shaft 520 can be connected to the main body and the plug 530 can be electronically connected to the main body 510.

The shaft 520 can include a second shaft 522 rotatably connected to the shaft 520. The second shaft 522 can be connected to the plug 530.

Figure 5C:
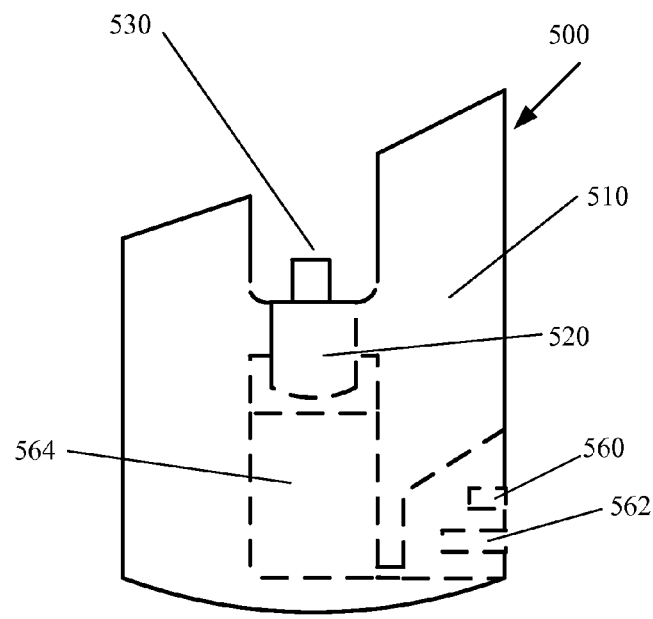
FIG. 5C is a section perspective view of the shaft and electronic connection to the first port according to an exemplary embodiment of the invention.

FIG. 5C is a sectional perspective view of the shaft and electronic connection to the first port according to an exemplary embodiment of the invention. As shown in FIG. 5C, a docking station 500 includes a main body 510, a shaft 520, a plug 530, an analog output 560, a port 562, and an electronic connection 564.

The plug 530 can be physically and/or electronically connected to the shaft 520. The shaft 520 can be physically and/or electronically connected to an electronic connection 564. The electronic connection 564 can be physically and/or electronically connected to the audio output 560 and/or port 562.

The electronic connection 564 can be a series or parallel connection between the plug 530 and the audio output 560 or port 562. The electronic connection 564 can be a simple pass-through where electrical signals received from the plug 530 and passed directly to the audio output 560 or port 562. The electronic connection 564 can be an active connection where the electrical signals received from the plug 530 are manipulated before being passed on to the audio output 560 or port 562. An example of manipulating an electrical signal can be receiving a digital signal via a Lightning-style connector, converting the signal to analog audio, and passing the analog signal to an output port for head phones.

FIGS. 6A-B is a section perspective view of the shaft and mechanical stop according to an exemplary embodiment of the invention. As shown in FIGS. 6A-B, a docking device 600 includes a main body 610, a shaft 620, a plug 630, a first channel 640, and a second channel intersecting the first channel 650. A shaft 620 includes a mechanical stop 622, and a groove 624.

The groove 624 can be attached to the main body 610. When applying a rotational force to the plug 630, the mechanical stop 622 can rotate within the groove 624. The groove 624 can be carved out within the main body 610 and can permit the mechanical stop to rotate up to, for example, 180 degrees.

One of skill in the art will appreciate that the mechanical stop 622 and the groove 624 can be employed in different methods to achieve the objectives of the invention, including have the mechanical stop 622 attached to the main body 610 and the groove 624 on the shaft 620.

FIG. 6C is a sectional top-down view of the shaft and mechanical stop according to an exemplary embodiment of the invention. As shown in FIGS. 6A-B, a docking device 600 includes a main body 610, a shaft 620, a plug 630, a first channel 640, and a second channel intersecting the first channel 650. A first channel 640 can include a front wall 642 and a back wall 644. A shaft 620 can include a mechanical stop 622 and a groove 624.

The groove 624 can be formed in the main body 610. When applying a rotational force to the plug 630, the mechanical stop 622 can rotate within the groove 624. The groove 624 can be formed in the main body 610 and can permit the mechanical stop to rotate up to, for example, 180 degrees from the initial starting point of 0 degrees.

One of skill in the art will appreciate that the mechanical stop 622 and the groove 624 can be employed in different methods to achieve the objectives of the invention, including have the mechanical stop 622 attached to the main body 610 and the groove 624 on the shaft 620.

Figure 7A:
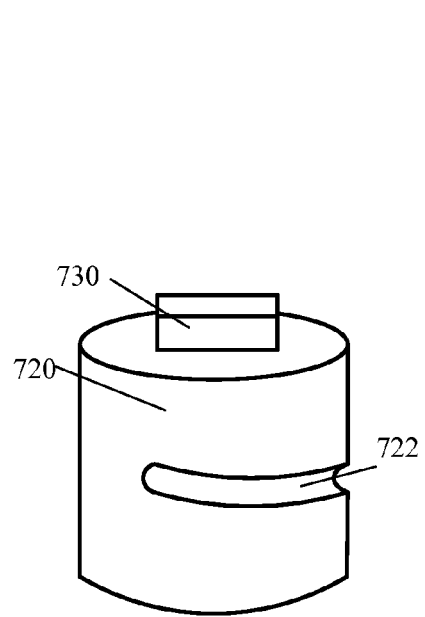
FIGS. 7A-B is a section perspective view of the shaft and mechanical stop according to an exemplary embodiment of the invention.
Figure 7B:
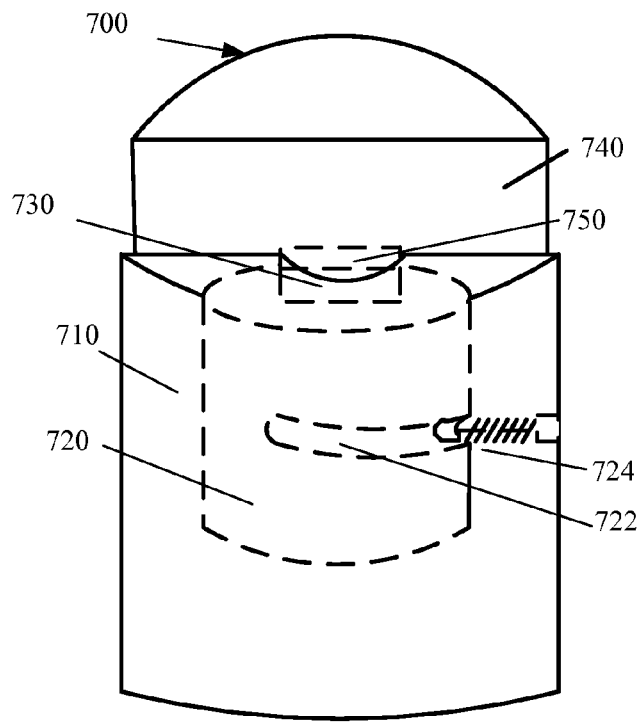

FIGS. 7A-B is a section perspective view of the shaft and mechanical stop according to an exemplary embodiment of the invention. As shown in FIGS. 7A-B, a docking device 700 includes a main body 710, a shaft 720, a plug 730, a first channel 740, and a second channel intersecting the first channel 750. A shaft 720 includes a groove 722 and a mechanical stop 724.

The mechanical stop 724 can consist of an inner shaft and spring device. When applying a rotational force to the plug 730, the shaft 720 will rotate in the direction of the force. While rotating, the mechanical stop 724 can slide within the groove 722 until the groove deepens and ends. At the point the mechanical stop 724 and spring can extend to make an audible clicking sound and prevent further rotation of the shaft 720 and plug 730. The groove 722 can be carved out within the shaft 710 and can permit the shaft 720 to rotate up to 180 degrees until the mechanical stop 724 is engaged.

One of skill in the art will appreciate that the mechanical stop 724 and the groove 722 can be employed in different methods to achieve the objectives of the invention, including have the mechanical stop 722 attached to the shaft 720 and the groove 722 on the main body 710.

Figure 7C:
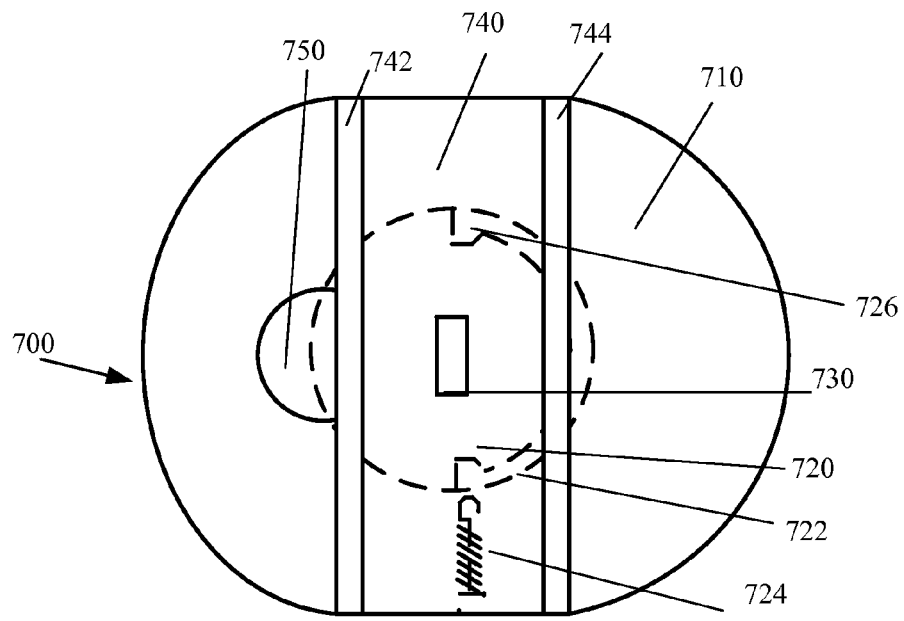
FIG. 7C is a section top-down view of the shaft and mechanical stop according to an exemplary embodiment of the invention.

FIG. 7C is a section top-down view of the shaft and mechanical stop according to an exemplary embodiment of the invention. As shown in FIGS. 7A-B, a docking device 700 includes a main body 710, a shaft 720, a plug 730, a first channel 740, and a second channel intersecting the first channel 750. A shaft 720 can include a groove 722, a mechanical stop 724, and an engaging trench 726. A first channel 740 can include a front wall 742, and back wall 744.

When applying a rotational force to the plug 730, the shaft 720 can rotate in the groove 722 and the mechanical stop 724 can slide within the groove 722. The groove 722 can be carved out within the shaft 720 and at the position of 0 degrees and 180 degrees, the engaging trench 726 is embedded. When the mechanical stop 724 reaches the engaging trench 726, the mechanical stop 724 engages and prevents further rotation of the shaft 720 and plug 730.

The ability to rotate the connector can be advantageous for achieving a docking station that is compatible with a variety of devices such as many common Android devices that utilize a micro-USB connector. While the micro-USB connector is a standard, the orientation is not. A rotatable connector facilitates compatibility with many Android devices regardless of the orientation of the micro-USB connector.

Although the present invention has been described in considerable detail with reference to certain preferred embodiments, other embodiments which do not vary from the sprit or scope of this invention are contemplated. Therefore, the appended claims should not be limited to the description of the preferred embodiments contained herein.

It will be apparent to those skilled in the art that various modifications and variations can be made in a high density docking station without departing from the spirit or scope of the invention. Thus, it is intended that embodiments of the invention cover the modifications and variations of this invention provided they come within the scope of the appended claims and their equivalents.

What is claimed is:

1. A docking station for holding an electronic device, the docking station comprising:
   a main body;
   a first channel in the main body;
   a back side of the first channel;
   a front side of the first channel;
   a first plug in the first channel;
   a first port electronically connected to the first plug;
   an extraction force associated with the first plug;
   wherein a normal force of the main body is greater than an extraction force associated with the first plug; and
   wherein the main body is formed primarily from a first material and a net density of the main body is greater than half of the density of the first material.

2. The docking station of claim 1 further comprising an interchangeable insert in the first channel.

3. The docking station of claim 2 wherein the insert comprises:
   a rear wall;
   a front wall;
   a bottom wall;
   a cutout in the bottom wall; and
   a distance between the rear wall and the front wall, the distance being less than or equal to a width of the first channel.

4. The docking station of claim 3 wherein the insert further comprises:
   a left wall; and
   a right wall.

5. The docking station of claim 2 wherein the first plug protrudes through the cutout.

6. The docking station of claim 1 further comprising a second channel in the main body, the second channel intersecting the front side of the first channel.

7. The docking station in claim 1 wherein the first material is zinc.

8. The docking station of claim 1 further comprising a shaft connected to the first plug, the shaft being rotatably connected to the main body.

9. The docking station of claim 1 further comprising of a mechanical stop associated with the shaft, wherein the mechanical stop limits the rotation of the shaft from 0 degrees to 180 degrees.

10. A docking station for holding an electronic device, the docking station comprising:
    a main body;
    a first channel in the main body;
    a back side of the first channel;
    a front side of the first channel;
    a first plug in the first channel;
    a shaft connected to the first plug and rotatably connected to the main body;
    a first port electronically connected to the first plug;
    an extraction force associated with the first plug;
    wherein a normal force of the main body is greater than the extraction force associated with the first plug; and
    wherein the main body is formed primarily from a first material and a net density of the main body is greater than half of the density of the first material.

11. The docking station of claim 10 further comprising further comprising an interchangeable insert in the first channel.

12. The docking station of claim 11 wherein the insert comprises:
- a rear wall;
- a front wall;
- a bottom wall;
- a cutout in the bottom wall; and
- a distance between the rear wall and the front wall, the distance being less than or equal to a width of the first channel.

13. The docking station of claim 12 wherein the insert further comprises:
- a left wall; and
- a right wall.

14. The docking station in claim 10 wherein the first material is zinc.

15. The docking station of claim 10 further comprising of a second channel in the main body, the second channel intersecting the front side of the first channel.

16. The docking station of claim 10 further comprising of an audio output electronically connected to the first plug.

17. The docking station of claim 10 further comprising of a second shaft vertically mounted and slidably connected to the first shaft.

18. The second shaft of claim 17 wherein the first plug is mounted to the second shaft.

19. The second shaft of claim 17 further comprising of a mechanical stop associated with the shaft and the mechanical stop limits the rotation of the second shaft from 0 degrees to 180 degrees.

20. A docking station for holding an electronic device, the docking station comprising:
- a main body;
- a first channel in the main body;
- a back side of the first channel;
- a front side of the first channel;
- an interchangeable insert in the first channel;
- a rear wall of the insert;
- a front wall of the insert;
- a bottom wall of the insert;
- a cutout in the bottom wall of the insert;
- a distance between the rear wall and the front wall, the distance being less than or equal to a width of the first channel;
- a shaft rotatably connected to the main body;
- a first plug in the first channel and connected to the shaft;
- a first port electrically connected to the first plug;
- an extraction force associated with the electronic device;
- wherein the weight of the main body is greater than the extraction force associated with the electronic device;
- wherein said main body is formed primarily from a first material and a net density of the main body is greater than half of the density of the first material.

21. The docking station of claim 20 wherein the first plug passes through the cutout.

22. The docking station in claim 20 further comprising of a second channel in the main body, the second channel intersecting the front side of the first channel.

* * * * *